United States Patent
Shirai et al.

(10) Patent No.: US 6,844,723 B2
(45) Date of Patent: Jan. 18, 2005

(54) ROTATION DETECTING DEVICE (75) Inventors: Katsuyoshi Shirai, Anjo (JP); Kenichi Taguchi, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/787,977

(22) Filed: Feb. 27, 2004

(65) Prior Publication Data

US 2004/0217754 A1 Nov. 4, 2004

(30) Foreign Application Priority Data

Feb. 27, 2003 (JP) ........................................ 2003-051580

(51) Int. Cl.$^7$ .............................................. G01R 33/02
(52) U.S. Cl. .................. 324/207.25; 324/173
(58) Field of Search ................. 324/166–168, 324/172–174, 207.13, 207.2, 207.25; 318/647, 651–653

(56) References Cited

U.S. PATENT DOCUMENTS 4,710,683 A * 12/1987 Bahn et al. ................ 318/254
6,630,821 B2 * 10/2003 Shinjo et al. .......... 324/207.21

FOREIGN PATENT DOCUMENTS

JP             11-64363         8/1997

* cited by examiner

*Primary Examiner*—Bot LeDynh
(74) *Attorney, Agent, or Firm*—Reed Smith LLP; Stanley P. Fisher, Esq.; Juan Carlos A. Marquez, Esq.

(57) ABSTRACT

A rotation detecting device includes a rotating direction determining means for determining a rotating direction of the rotor based on a first signal and a second signal, generating a rotating direction signal based on the first signal and the second signal, and outputting a rotating direction determining signal by switching the rotating direction signal with an external switching signal wherein the pulse signal generating means generates the pulse signal in response to the rotating direction determining signal.

4 Claims, 6 Drawing Sheets

ROTATION DETECTING DEVICE

This application is based on and claims priority under 35 U.S.C. § 119 with respect to Japanese Application No. 2003-051580 filed on Feb. 27, 2003, the entire content of which is incorporated herein by reference.

FIELD OF THE INVENTION

This invention generally relates to a rotation detecting device for detecting the rotation speed of a rotor.

BACKGROUND OF THE INVENTION

A known rotation detecting device including magnetic detecting element for detecting the rotating condition of a rotor is disclosed in Japanese Patent Laid-Open Publication published as H11(1999)-64363. A first magnetic detecting element and a second magnetic detecting element are provided opposed to the rotor, and a signal processing device generates pulse signal being synchronized with the rotating condition of the rotor for indicating positive or reverse condition of the rotation of the rotor based on rotation signals generated by the first magnetic detecting element and the second magnetic detecting elements. The signal processing device generates the pulse signal with different pulse widths to distinguish between the case where the first magnetic detecting element generates the rotation signal prior to the first magnetic detecting element and the case where the second magnetic detecting element generates the rotation signal prior to the first magnetic detecting element, so that the rotating condition of the rotor, rotating in the positive direction or the reverse direction, can be specified based on such pulse signals.

Such rotation detecting devices, for example, may be provided at rotation speed sensor on both left and right side of the vehicle opposed to the rotors being made of magnetic material and rotating integrally with vehicle wheels for detecting the rotating speeds of the vehicle wheels.

The rotation detecting devices detect the rotating directions of the vehicle wheels on both right and left side of the vehicle in vehicle width direction, however, the signal generated from either one of the rotation detecting devices for indicating a rotating direction results in indicating the opposite direction because such devices provided on both right and left side of the vehicle in vehicle width direction are not symmetrical configuration. As a result, the pulse signal indicating the positive rotation or the reverse rotation (e.g. forward movement or reverse movement of the vehicle) results in being reversed. To solve aforementioned problems, a rotation detecting device having a configuration for outputting an opposite pulse signal needs to be provided, however, it drives the cost of the vehicle way up.

The present invention therefore takes account the aforementioned problems and seeks to provide a device for switching the pulse output between a positive condition and a reverse condition. In addition, the present invention also seeks to provide a device which can be used commonly on left, right, upper and lower sides of the vehicle.

SUMMARY OF THE INVENTION

A rotation detecting device for a rotor includes a magnetic detecting means including a first magnetic detecting element for outputting a first signal and a second magnetic detecting element for outputting a second signal, a pulse signal generating means generating a pulse signal of a positive rotation or a reverse rotation being synchronized with the rotating condition of the rotor based on the first signal and the second signal transmitted from the magnetic detecting means provided opposed to the rotor made of a magnetic material, a rotating direction determining means for determining a rotating direction of the rotor based on the first signal and the second signal, generating a rotating direction signal based on the first signal and the second signal, and outputting a rotating direction determining signal by switching the rotating direction signal with an external switching signal, wherein the pulse signal generating means generates the pulse signal in response to the rotating direction determining signal.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

A preferred embodiment of the present invention will be described hereinbelow in detail with reference to the accompanying drawings.

(First embodiment)

Figure 1:
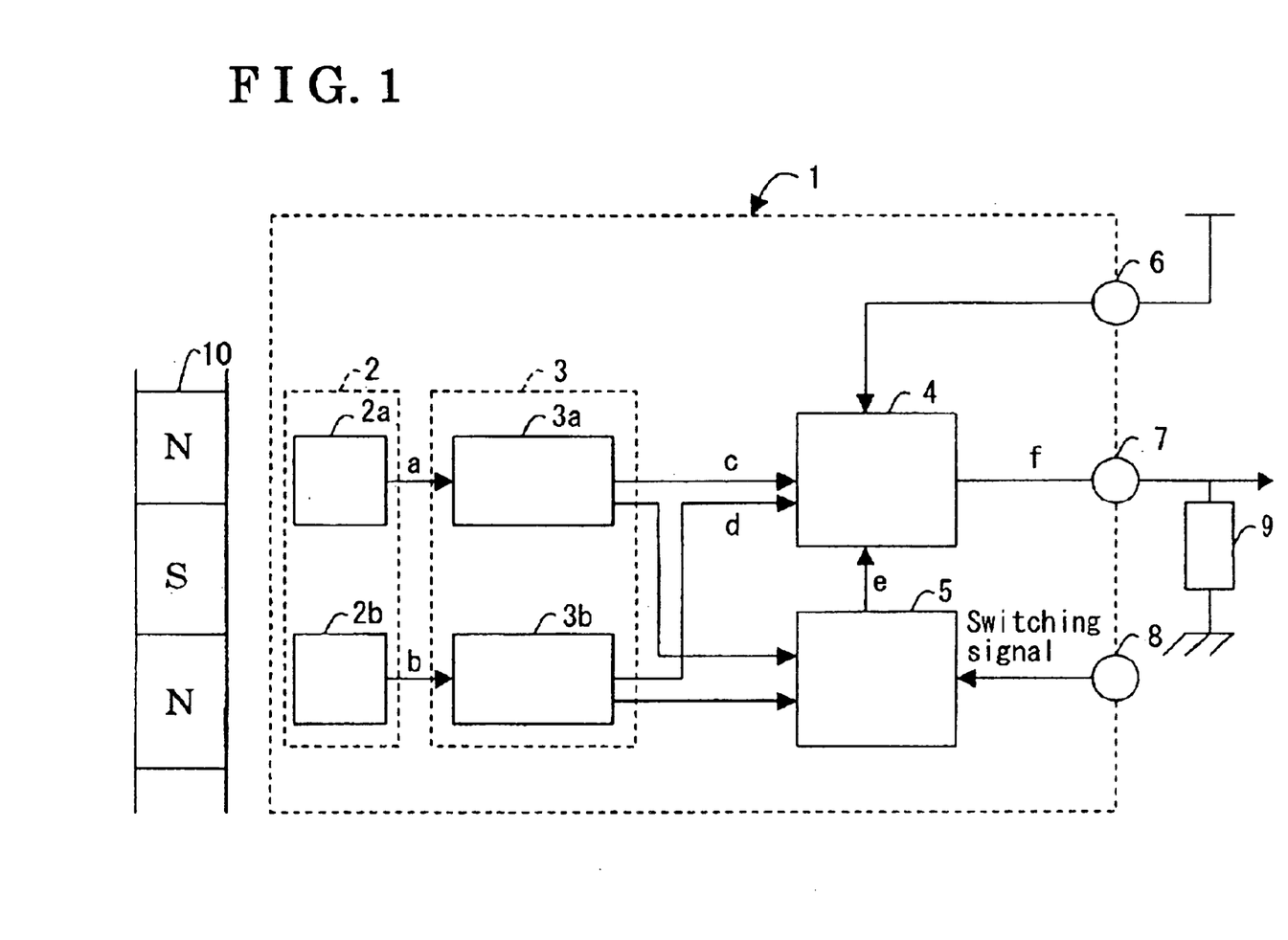
FIG. 1 illustrates a block diagram showing a rotation detecting device provided relative to a rotor.

FIG. 1 illustrates a block diagram indicating the structure of a rotation detecting device 1 according to the first embodiment of the current invention. As shown in FIG. 1, the rotation detecting device 1 internally includes a magnetic detecting element 2, an amplifier 3 amplifying and waveforming signals transmitted from the magnetic detecting element 2, a rotating direction determining circuit 5 determining the rotating direction based on the amplified rotation signals, and a pulse signal generating circuit 4 outputting a pulse signal being positive rotation or reverse rotation based on the rotating direction determining signal transmitted from the rotating direction determining circuit 6.

The magnetic detecting element 2 includes a magnetic detecting element 2a (first magnetic detecting element) and a magnetic detecting element 2b (second magnetic detecting element) as represented by a hall IC or a MRE (Magneto-Resistance Element). The magnetic detecting element 2a and 2b are provided near and opposed to the rotor 10 as a rotating body. The magnetic detecting element 2a and 2b are provided in parallel with the rotor 10 keeping a predetermined clearance therebetween.

Figure 4:
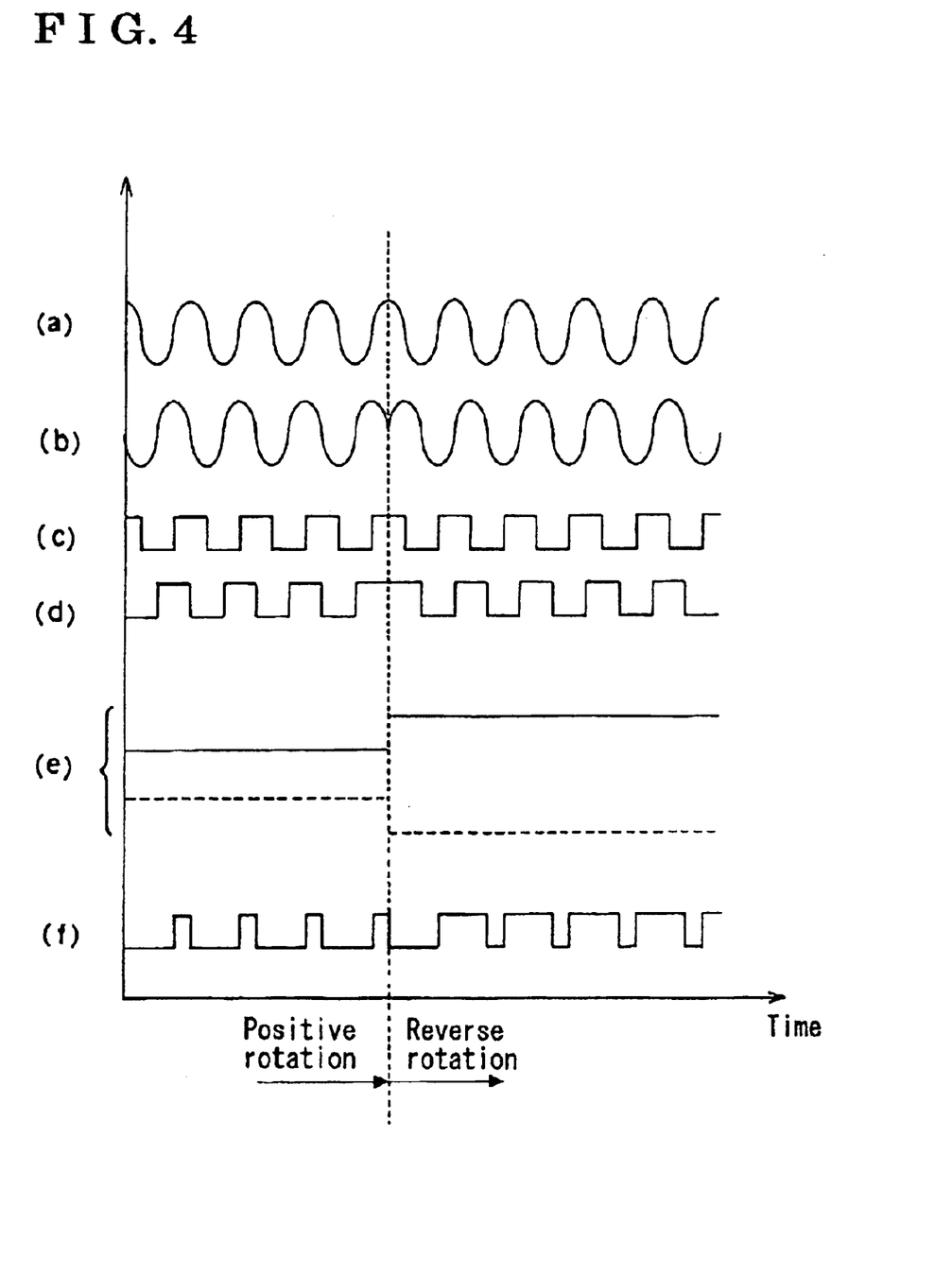
FIG. 4 illustrates a timing diagram of signals at essential points in FIG. 1.

The rotor 10 being disk-shape or cyclical-shape is made of magnetic material (e.g. steel plate), and outer peripheral surface thereof is magnetized alternately with north-poles and south-poles. The rotor 10 rotates in one direction (positive rotation) and the other direction (reverse rotation), and the magnetic detecting element 2a and 2b detect the rotating condition of the rotor 10. The magnetic detecting element 2a and 2b detect respectively changes of the magnetic field generated by the rotating condition of the rotor 10, and convert the changes into electric signals. In this case, the magnetic detecting element 2a outputs first signal (shown in FIG. 4(a)), and the magnetic detecting element 2b outputs second signal (shown in FIG. 4(b)). These rotation signals, the first signal and the second signal, indicate the rotating condition of the rotor 10 and are synchronized with the rotating speed of the rotor 10. The first signal indicating the rotating condition of the rotor 10 is amplified and wave-formed by the amplifier 3a (shown in FIG. 4(c)), at the same time, the second signal is amplified and wave-formed by the amplifier 3b (shown in FIG. 4(d)). These signals amplified by the amplifier 3 are transmitted into the pulse signal generating circuit 4 and the rotating direction determining circuit 5.

The rotating direction determining circuit 5 determines the rotating direction of the rotor 10 based on the conditions of the first signal and the second signal amplified and wave-formed by the amplifier 3. The rotating direction determining circuit 5 outputs the rotating direction determining signal to the pulse signal generating circuit 4. The rotating direction determining signal reverses the rotating direction of the rotor 10 by the switching signal. A configuration of the rotating direction determining circuit 5 will be explained hereinbelow in detail with reference to FIG. 2.

Figure 2:
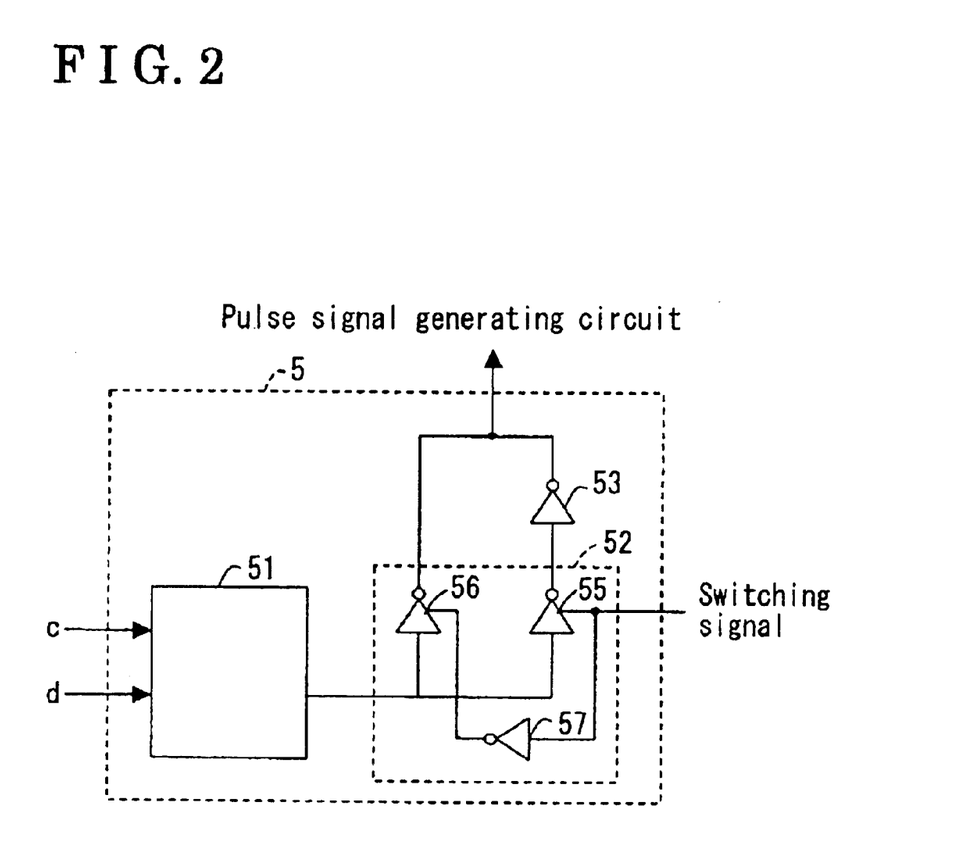
FIG. 2 illustrates a block diagram of an inner configuration of a rotating direction determining circuit shown in FIG. 1 according to the first embodiment of the current invention.

As shown in FIG. 2, the rotating direction determining circuit 5 includes a judging circuit 51 for judging the rotating direction of the rotor 10 and transmitting the rotating direction signal based on the first signal from the magnetic detecting element 2a and the second signal from the magnetic detecting element 2b, a switching circuit 52 for changing the rotating direction signal into a first condition or a second condition based on the external switching signal, and a reversing circuit 53 for reversing the rotating direction signal when the rotating signal is in the second condition.

The rotating direction judging circuit 51 judges the rotating direction of the rotor 10 based on the electric signals transmitted from the magnetic detecting elements 2a and 2b. For example, when the rotor 10 rotates in positive direction, the signal of the magnetic detecting element 2b delays relative to the magnetic detecting element 2a with interval between the magnetic detecting elements 2a and 2b (an outer peripheral length of the rotor 10). Focusing on a signal's rising edge or a falling edge of either one of the magnetic detecting elements 2a or 2b, the condition of the other magnetic detecting element is detected depending on the signal's edge change. According to the judging means shown in following [Table 1] or [Table 2], the rotating direction of the rotor 10 is judged, then the rotating direction judging circuit 51 transmits the rotating direction signal.

TABLE 1

| Condition of the first magnetic detecting element | Condition of the second magnetic detecting element | Rotating direction |
|---|---|---|
| L→H | L | Positive rotation |
| H→L | H | Positive rotation |
| L→H | H | Reverse rotation |
| H→L | L | Reverse rotation |

TABLE 2

| Condition of the first magnetic detecting element | Condition of the second magnetic detecting element | Rotating direction |
|---|---|---|
| H | L→H | Reverse rotation |
| L | H→L | Reverse rotation |
| L | L→H | Positive rotation |
| H | H→L | Positive rotation |

The rotating direction signal generated by the aforementioned judging means is transmitted into the switching circuit 62.

The switching circuit 52 at which the rotating direction signal is input includes switching elements 55 and 56 for switching between the first condition and the second condition, and a reversing circuit 57. The connecting condition of each element of the switching circuit 52 will be explained as follows. One end of the reversing circuit 57 (input terminal is connected to the control terminal of the switching elements 56 of the switching circuit 52. The other end of the reversing circuit 57 (output terminal) is connected to the control terminal of the switching elements 55 of the switching circuit 52. The each input terminal of the switching elements 55 and 56 are connected each other, and the rotating direction signal output from the rotating direction judging circuit 51 is input into the input terminals. In addition, a signal terminal (output terminal) of the switching element 55 is connected to the one end (input terminal) of the reversing circuit 53. A signal terminal of the switching element 56 is connected to the other end (output terminal) of the reversing circuit 53, so that the rotating direction determining signal is transmitted. In response to such connecting condition, when a low voltage (L) is applied to the switching signal, the switching element 55 is turned on (e.g. shown in the solid line (e) in FIG. 4), and a high voltage (H) is applied to the switching signal, the switching element 56 is turned on (e.g. shown in the dashed line (e) in FIG. 4). Low-active switching elements are used as switching elements 55 and 56 in the first embodiment of the current invention; however, high-active switching elements can be used alternatively. In addition, the switching elements 55 and 56 are not limited to the aforementioned switching element. The switching circuit 52 may be an element or a logical circuit which can switch the condition of the transmitted rotating direction signal between the first condition and the second condition by the switching signal, and a transistor or FET may be used as a switching element. The selecting process between the first condition and the second condition by the switching circuit will be explained in detail as follows. When an external switching signal of a predetermined electric voltage (e.g. 5V) is applied to the switching circuit 52, the first condition is selected in the switching circuit 52. On the other hand, when an earth voltage is applied to the switching circuit 52, the second condition is selected in the switching circuit 52. Opposite condition can be applied to the selecting process.

When the earth voltage (e.g. 0V) is applied to the switching circuit 52, the first condition is selected in the switching circuit 52, on the other hand, when the external switching signal of a predetermined electric voltage (e.g. 5V) is applied to the switching circuit 52, the second condition is selected in the switching circuit 52.

In aforementioned configuration, the switching circuit 52 can reversibly output the rotating direction determining signal based on the rotating direction signal transmitted from the rotating direction judging circuit 51 by selecting the voltage applied to the switching circuit 52 from outside as a switching signal (Refer to the solid line and the dashed line in FIG. 4(e)).

The pulse signal generating circuit 4 shown in FIG. 1 generates a pulse signal being synchronized with the rotating condition of the rotor 10 from a terminal 7 at which a resistance 9 (earth resistance) being connected to the ground at one end thereof is connected in response to the rotating direction determining signal from the rotating direction determining circuit 5 (Shown in FIG. 4(f). In the pulse signal generating circuit 4, for example, when the rotating direction judging circuit 51 judges that the rotor 10 rotates in the positive direction based on the signal from the magnetic detecting elements 2a and 2b, a pulse signal having relatively short pulse width is output from the terminal 7. On the other hand, the rotating direction judging circuit 51 judges that the rotor 10 rotates in the reverse direction, a pulse signal having relatively long pulse width is output from the terminal 8. In this case, the opposite condition can be applied to the judging process. For example, the pulse signal having relatively longer pulse width can be output from terminal 7 when the rotor 10 rotates in the positive direction. According to this configuration, the pulse width is changed relative to the rotating directions of the rotor 10; however, the wave form may be changed alternatively to distinguish the rotating direction of the rotor 10.

As explained above, the rotation detecting device 1 can be downsized by integrating the magnetic detecting element 2, the amplifier 3, rotating direction determining circuit 5 and the pulse signal generating circuit 4 into a single chip 35 for decreasing the production cost and the number of the components. The chip 35 may be provided in a wheel speed sensor 30 shown in FIG. 3. The wheel speed sensor 30 includes the terminal 6 connected to the power supply voltage for external connection, the terminal 7 at which the pulse signal being synchronized with the rotor 10 integrally rotating with the vehicle wheel is output, and the terminal 8 at which the switching signal is input. The chip 35 is made of resin and insert molded.

Figure 3:
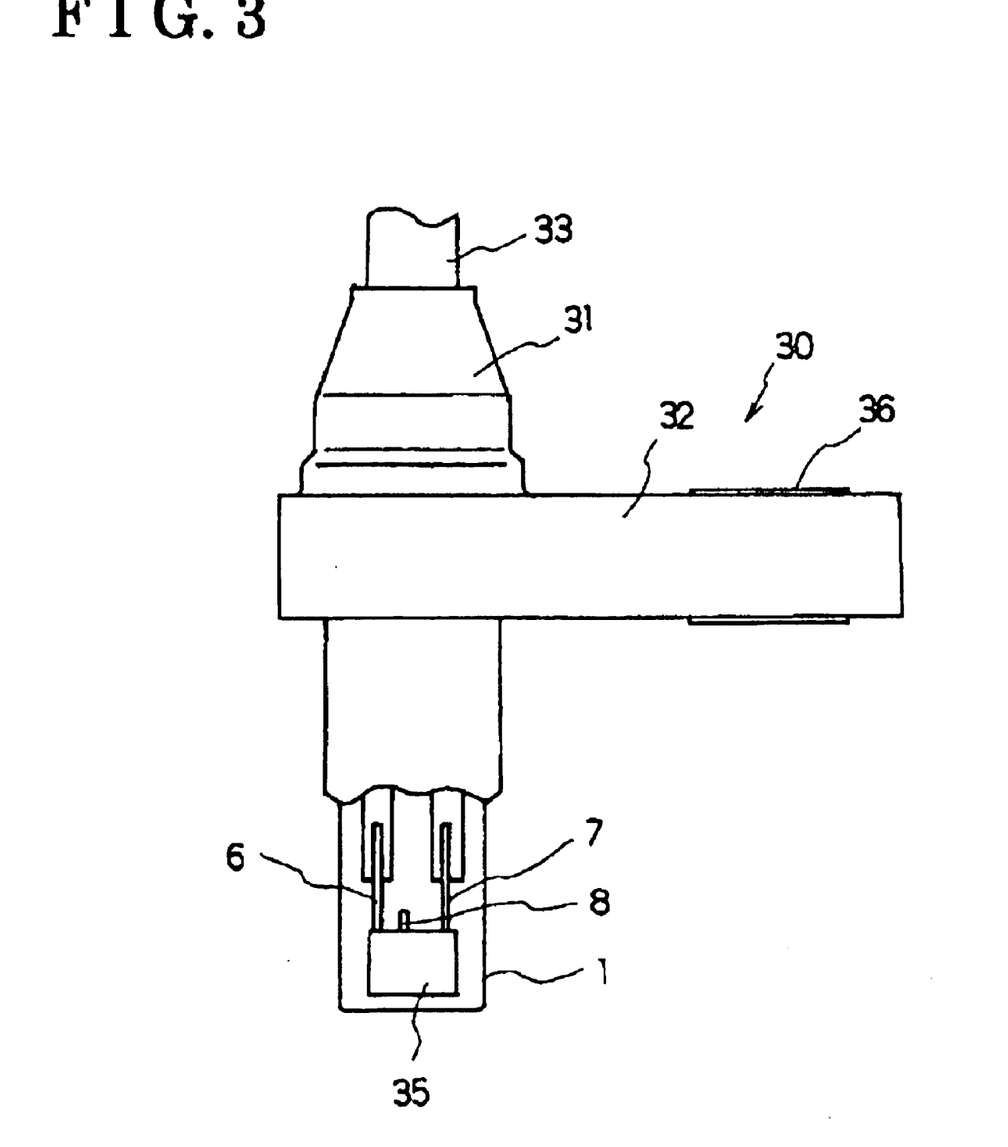
FIG. 3 illustrates a configuration diagram when the rotation detecting device shown in FIG. 1 is applied to a wheel sensor.

The wheel speed sensor 30 includes a body portion 31 being a long cylindrical form having the chip 35 at the one end thereof, and a flange portion 32 at which the wheel speed sensor 30 is mounted to the vehicle. The flange portion 32 extends from the body portion 31 in the right angle direction relative to the body portion 31. The wheel speed sensor 30 being close to the rotor 10 is mounted to a caliper and the like on the vehicle side relative to the rotor 10 rotating integrally with the wheel by tightening a bolt into a hole 36 provided at the end portion of the flange portion 32. The terminal 6,7 and 8 extends from the chip 35, and the chip 35 is electrically connected to an insert molded harness 33 extending from the body portion 31. The power is supplied to the chip 35 through a connector (not shown) connected to the end of the harness 33. When a predetermined voltage (e.g. 5V) is applied to the terminal 6 of the wheel speed sensor 30, the pulse signal is transmitted from the terminal 7. In this case, the predetermined voltage or an earth voltage is applied to the terminal 8 of the wheel speed sensor 30, the condition of the rotating direction determining signal can be reversed. For example, when the terminal 8 at which the switching signal is input is electrically connected to either one of the terminal 6 or the terminal 7, the predetermined voltage or the earth voltage is applied as the switching signal, as a result, the condition of the switching element of the switching circuit 52 can be switched between the first condition and the second condition.

Thus, when the wheel speed sensors 30 are mounted to the vehicle side relative to the rotors 10 rotating integrally with the right and left wheels in vehicle width direction, the pulse signals indicating the rotating direction of the rotor 10 can be reversed by the switching signal transmitted from the outside of the chip. As a result, there is no need to prepare two different kinds of rotation detecting devices being mounted to the right and the left wheels. Same rotation detecting devices can be used commonly on the right and the left sides by reversing the pulse output at either one of them. The rotation detecting devices also may be mounted to the upper and the lower side.

(Second embodiment)

Figure 5:
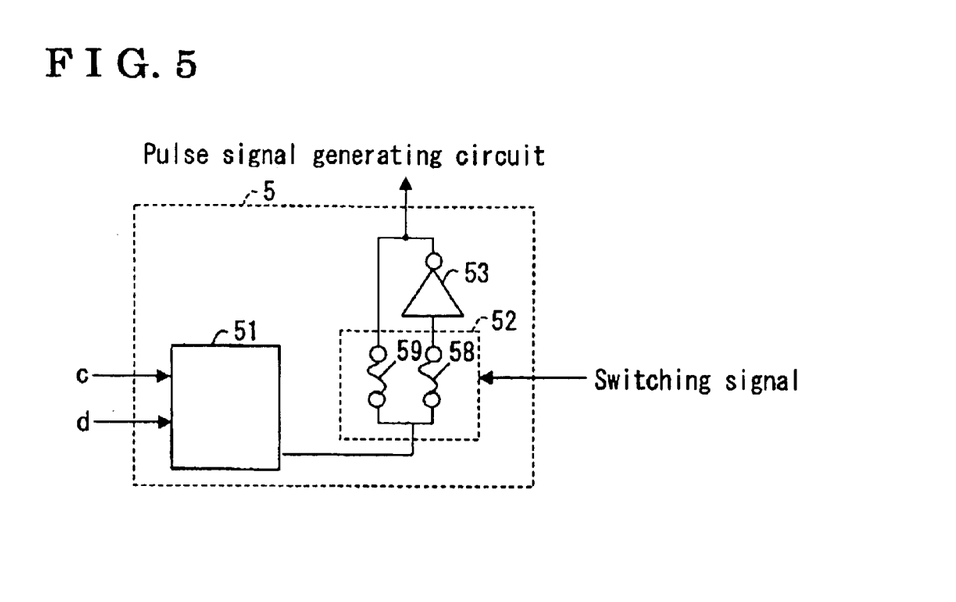
FIG. 5 illustrates a block diagram of the rotating direction determining circuit in FIG. 1 according to the second embodiment of the current invention.

As a second embodiment of the current invention, the switching circuit 52 in FIG. 2 may includes a fuse 58 and 59. The switching element 55 in the first embodiment shown in FIG. 1 may be replaced by the fuse 58, and the switching element 56 in the first embodiment shown in FIG. 1 may be replaced by the fuse 59. When the switching signal of high-voltage is applied to the switching circuit, the fuse 58 is blown, and when the switching signal of low voltage is applied to the switching circuit, the fuse 59 is blown. In this way, the rotating direction determining signal has been settled by selecting the first condition or the second condition depending on the mounting condition of the rotation detecting device 1. Once such process, blowing either one of the fuse 58 or the fuse 59, has been done in the first place, the wheel speed sensors 30 mounted to both sides of the vehicle in vehicle width direction can output the same pulse signals regardless of the rotating condition is positive or reverse. In addition, such configuration can keep the cost down and the structure becomes simple.

(Third embodiment)

Figure 6:
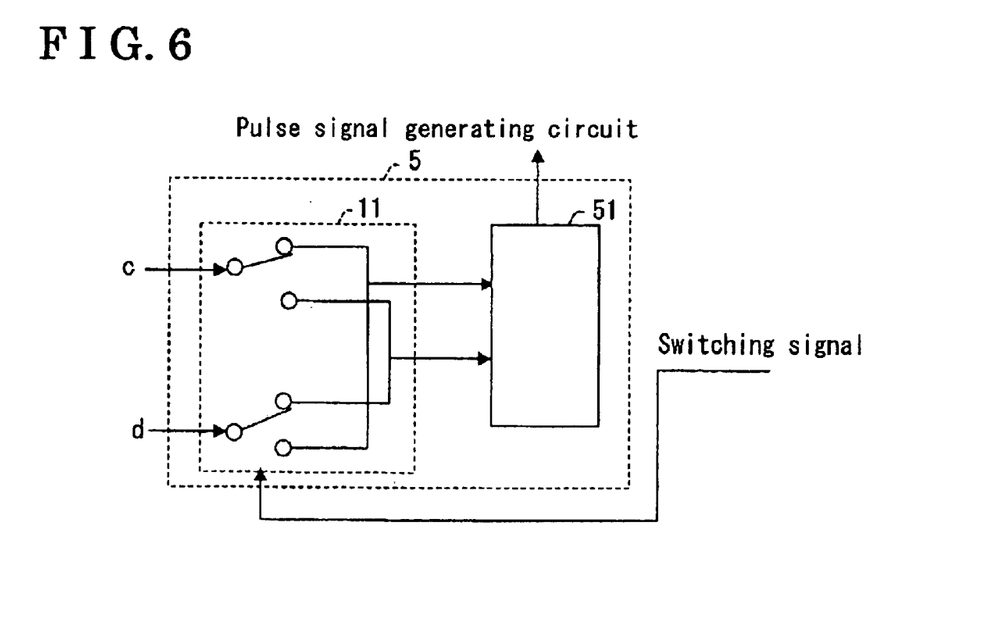
FIG. 6 illustrates a block diagram of the rotating direction determining circuit in FIG. 1 according to the third embodiment of the current invention and FIG. 7 illustrates a block diagram of the rotating direction determining circuit in FIG. 1 according to the fourth embodiment of the current invention.

A third embodiment of the current invention is shown in FIG. 6. In the first embodiment and the second embodiment, as aforementioned above, the switching circuit 52 is provided at the output side of the rotating direction judging circuit 51, however, the switching circuit 52 may be provided at the input side of the rotating direction judging circuit 51. In this case, the switching circuit 52 includes a relay 11 having 2 inputs and 2 outputs, and the relay 11 is provided before the rotating direction judging circuit 51. The inputs of the relay 11 are connected to the outputs of the amplifiers 3a and 3b. On the other hand, the outputs of the relay 11 are connected to the rotating judging circuit 51, then the output of the rotating judging circuit 51 is connected to the pulse signal generating circuit 4. In this configuration, the switching signal of high-voltage is applied to the relay 11, the relay 11 selects the first signal transmitted from the magnetic detecting element 2a (this condition is shown in FIG. 6). On the other hand, the switching signal of low-voltage is applied to the relay 11, the relay 11 selects the second signal transmitted from the magnetic detecting element 2b (the switches shown in FIG. 6 changes the contacting points thereof to the other contacting points). Either one of these signals is transmitted into the rotating direction determining circuit 5.

(Fourth embodiment)

Figure 7:
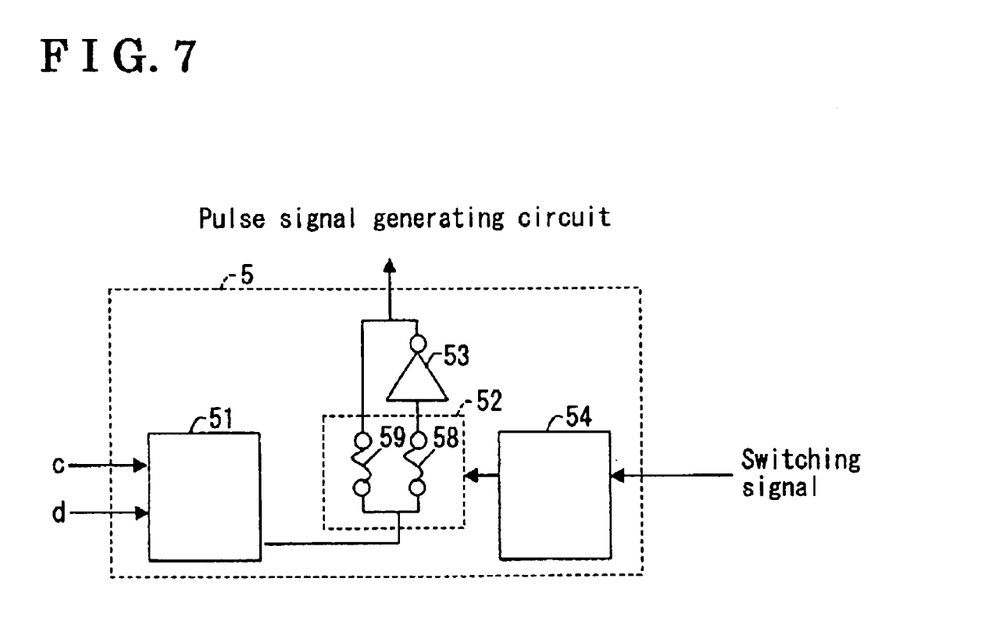

The fourth embodiment of the current invention is shown in FIG. 7. The fourth embodiment is a deformation of the second embodiment of the current invention. In this embodiment, the contacting condition of the switching circuit 52 is switched between the first condition and the second condition based on the signal applied to the element 6 transmitting power to the rotation detecting device. Then the switching circuit outputs the rotating direction determining signal to the pulse signal generating circuit 4. When the wheel speed sensor 30 having chip 35 therein is normally used, a predetermined voltage (e.g. 5V, 12V) is applied to the element 6, however, when the wheel speed sensors 30 are mounted both right and left side of the vehicle in vehicle width direction, higher voltage signal (e.g. 18V 24V) than the predetermined voltage applied to the terminal 6 is applied to either one of these speed sensors 30 for outputting the same pulse signals. As a result, a voltage level of the voltage signal applied to the terminal 6 or a predetermined regular voltage pattern is judged by a programming circuit 54 provided in the rotating direction determining circuit 5. The programming circuit 54 judges whether the voltage applied to the terminal 6 is the signal for setting the switching circuit 52's condition to the first condition or the voltage applied to the terminal 6 is the signal for setting the switching circuit 52's condition to the second condition. Then, the rotating direction determining signal is determined by blowing either one of the fuse 58 and the fuse 59 in the switching circuit 52, then either one of the pulse signals is reversed, as a result, the same signals are transmitted from the both rotating direction determining circuits 5.

In this case, the switching signal transmitted into the rotating direction determining circuit 5 can easily reverse the pulse signal transmitted from the rotation detecting device 1 with a simple configuration using the voltage signal from terminal 6 at witch the voltage signal is input, instead of the signal transmitted from the terminal 8. In the aforementioned configuration, the signal from the terminal 8 is not necessary, so that the terminal 8 can be removed.

As explained above, the rotation detecting device 1 is installed into a chip, and the rotating direction determining signal can be reversed depending on the mounting condition of the wheel speed sensor 30 to the vehicle by applying the switching signal from the terminal 8 to the rotating direction determining circuit 5, as a result, the pulse signal can be reversed with a simple circuit.

A magnetic rotor has been used in the embodiments of the current invention; however, the magnet may be provided inside the rotation detecting device 1 for detecting the rotating condition of the rotor having a geared peripheral surface or a slit inside portion.

In addition, the rotation detecting device 1 includes two magnetic elements 2a and 2b, however, the number of the magnetic detecting element is not limited unless these signals can generate quarter-phase signals.

As described above, according to the current invention, a rotation detecting device can change a pulse output from a pulse signal generating means by applying an external switching signal to a rotating direction detection means. Thus, a pulse output can be easily switched even if the rotation detecting devices are provided at the left and the right sides, or upper and lower sides of the vehicle. So that a single type of rotation detecting device can be used commonly at left, right, upper or lower side of the vehicle with.

In this case, a pulse output can be reversed by applying a predetermined voltage or an earth voltage as a switching signal.

In addition, the pulse output can be reversed by switching a switching element by applying the predetermined voltage or the earth voltage as a switching signal, or by blowing a fusing element.

Furthermore, the rotation detecting device is downsized by integration, and the pulse output can be reversed only by applying the switching signal.

The principles, preferred embodiment and mode of operation of the present invention have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A rotation detecting device for a rotor comprising:

a magnetic detecting means including a first magnetic detecting element for outputting a first signal and a second magnetic detecting element for outputting a second signal;

a pulse signal generating means generating a pulse signal of a positive rotation or a reverse rotation being synchronized with the rotating condition of the rotor based on the first signal and the second signal transmitted from the magnetic detecting means provided opposed to the rotor made of a magnetic material;

a rotating direction determining means for determining a rotating direction of the rotor based on the first signal and the second signal, generating a rotating direction signal based on the first signal and the second signal, and outputting a rotating direction determining signal by switching the rotating direction signal with an external switching signal, wherein the pulse signal generating means generates the pulse signal in response to the rotating direction determining signal.

2. A rotation detecting device according to claim 1, wherein the rotating direction determining means reverses the rotating direction signal by applying a predetermined voltage or an earth voltage to the switching signal.

3. A rotation detecting device according to claim 2, wherein the rotating direction determining means includes a switching element or a fusing element for reversing the rotating direction signal, and the rotating direction determining signal is reversed by the switching element or the fusing element.

4. A rotation detecting device according to claim 1, wherein the magnetic detecting means, the pulse signal generating means and the rotating direction determining means are integrated into a chip, and a terminal in which the external switching signal is input is provided at the chip.

\* \* \* \* \*